United States Patent [19]

Braun et al.

[11] 4,270,654
[45] Jun. 2, 1981

[54] SINGLE CHAIN SCRAPER CONVEYOR

[76] Inventors: Ernst Braun, Hofackerstr. 12b; Gert Braun, Hofackerstr. 12a, both of 43 Essen-Heisingen, Fed. Rep. of Germany

[21] Appl. No.: 951,038

[22] Filed: Oct. 13, 1978

[30] Foreign Application Priority Data

Oct. 22, 1977 [DE] Fed. Rep. of Germany ....... 2747505

[51] Int. Cl.$^3$ .................... B65G 19/00; B65G 23/00
[52] U.S. Cl. .................................. 198/729; 198/839
[58] Field of Search ............... 198/728, 729, 834, 839, 198/842

[56] References Cited

U.S. PATENT DOCUMENTS 2,235,991  3/1941  Hapman ............................. 198/729

Primary Examiner—Robert B. Reeves
Assistant Examiner—Douglas D. Watts
Attorney, Agent, or Firm—McGlew and Tuttle

[57] ABSTRACT

A single chain scraper conveyor comprises a trough having first and second straight sections disposed at angles to each other and an intermediate curved section between and joining the first and second straight sections. The intermediate section has an inner curved edge and an outer curved edge, and the trough has an opening along the inner curved edge. An endless chain is centered in and movable along the trough, and it carries a plurality of flights which extend across the chain at spaced locations along its length. Each flight has an inner end which moves around the inner curved edge of the intermediate curved section during operation. A deflector wheel is rotatably mounted adjacent the intermediate section, and it includes a periphery that is parallel to the inner edge, on which a plurality of heads are pivotally mounted at spaced circumferential locations. The heads include surfaces having V-shaped grooves or receiving recesses into which the inner end of each flight may engage. When engaged, the flight is guided by the head in its pivotal connection to the guide wheel around the inner edge of the intermediate curved section.

2 Claims, 2 Drawing Figures

SINGLE CHAIN SCRAPER CONVEYOR

BACKGROUND OF THE INVENTION

1. Field of the Invention

The invention relates in general to conveyors and in particular to a new and useful single-chain scraper conveyor comprising flights which are secured to an endless chain, and a conveyor trough with trough lengths bent to circular segments, in which, in a zone of a curved path, the radially extending flights of the advancing and return sides of the chain apply by their inside ends tangentially against the circumferential portion of a deflector wheel which extends in the plane of movement of the flights and over the entire length of the curved path and projects into the conveyor trough through an aperture provided in the side wall of the trough.

2. Description of the Prior Art

There is known a single-chain scraper conveyor in which the deflector wheel is provided on its circumference with a trough-shaped recess for advancing and return sides of the chain, engaging over the adjacent ends of the flights. While the trough-shaped recess fixes the position of the adjacent flight ends in the vertical plane, the static friction between the adjacent flight ends and the trough-shaped recess, caused by the high radial contact pressure, tends to retain the adjacent flight ends, within the range of the curved path, in their contact positions. With regard to the centrally applied chain, however, this results in an additional advance of the free ends of the flights on the outside of the curved path, through an angle corresponding to the path length difference between the free ends and the inside ends of the flights. That is, while moving through the curved path, the free ends of the flights must cover a longer distance than the inside flight ends. The same analogously holds for the chain itself and the central portion of the flights. Taking into account that the flights enter and leave the curved-path zone in an exactly radial position, this additional advance of the free ends of the flights must be compensated. This is done in a jerky advance motion of the inside ends of the flights, compensating for the path-length difference between the two ends. The jerky advance of the inside flight ends takes place as soon as the tensional forces acting centrally on the chain and the retaining forces on the inside flight ends resulting therefrom increase to an extent such that they exceed the static friction between the respective inside ends of the flights and the recess. This results in periodical chain loads by accumulated tensional and bending forces and subsequent sudden tension releases. Thereby, and by the fact that within the curved-path range and up to the compensation for the path-length difference the chain, ahead of and behind the flight, is stressed at different angles and the life of the chain is considerably reduced. In addition, the jerky advance of the inside ends of the flights leads to an increased wear and may cause catapulting of stones. All these drawbacks are to be eliminated by the invention.

SUMMARY OF THE INVENTION

The invention is directed to a single-chain scraper conveyor in which the flight ends which abut the deflector wheel in the zone of the curved path of movement are moved along almost continuously, so that from the instant of the engagement with the deflector wheel to the instant of their disengagement therefrom the flights remain in their radial positions and the hitherto experienced wear phenomena are substantially reduced while the life of the central chain is considerably extended.

To this end, the invention provides that the deflector wheel comprises pivoting heads distributed over the entire circumference of the wheel in conformity with the spacing of the adjacent flights ends, which heads are mounted for pivoting about pins extending in parallel to the wheel axis and provided, on their peripheral side, with recesses for receiving the adjacent flights ends. This inventive measure produces the effect that the inside ends of the flights entering the curved-path zone engage the pivoting heads and are centered in their radial position by the peripheral recesses. Then, while the flights travel through the curved path, the pivoting heads perform a pivotal motion in proportion to the path-length difference to be compensated between the free and the inside ends of the flights, so that a continuous travel through the curved-path distance is ensured and the flights are now actually held in their radial position even within the range of the curved path. A jerky advance of the adjacent flight ends is eliminated by the pivoting heads. The result is that the chain is stressed uniformly and its run at both sides of the flights is also uniform. In consequence, the means for securing the flights to the central chain are considerably relieved. The wear at the contact between the adjacent flight ends and the deflector wheel is substantially reduced. In accordance with the invention, the pivotal angle of the pivoting heads is equal to or greater than the angle predetermined by the path length difference between the free ends of the flights and the adjacent ends thereof. Preferably, the pivoting heads are designed as wedge-shaped or V-shaped segments of a trough section, and their recesses take the shape of concave slide pockets, so that the mounting of the pivoting heads on the deflector wheel is simplified and a satisfactory engagement of the inside ends of the flights in the recesses and a low unit stress of these ends are ensured. Further, the pivoting heads may be secured to the circumference of the deflector wheel in an exchangeable manner and made of a wear-resistant material such as chilled cast iron, cast steel, etc. As a rule, upon having passed through the curve-path portion and disengaged from the adjacent flight ends, the pivoting heads will return into their initial positions and thus pivot back in proportion to the path length difference between the free and the inside ends of the flights. To support this pivotal return motion, the invention teaches that a reset mechanism, for example, a cleaning brush or a leaf spring, is associated with the pivoting heads and disposed between the zone of disengagement and the zone of engagement of the flights with the deflector wheel. A cleaning brush, preferably of steel wire, has the advantage of providing at the same time for a cleaning of the recesses engaging over the inside ends of the flights.

The advantages obtained with the invention are to be seen primarily in the fact that a single-chain scraper conveyor is provided in which the flights, while traveling through a section formed of circularly bent trough lengths and thus through a curved-path section, are moved therethrough in a substantially continuous motion and maintain their radial position. This extends the life of the central chain considerably and, in addition, substantially reduces the wear. As a result, the performance of the single-chain scraper conveyor in a curved-path zone is substantially improved with simple means.

Accordingly, it is an object of the invention to provide a chain conveyor device in which a single chain with a plurality of flights therein are guided around a curved section which includes a deflector wheel mounted at the inner curve of the section and having a plurality of heads thereon which form seats which engage the ends of the flights and guide them around the inner edge of the curved section.

A further object of the invention is to provide a scraper conveyor which is simple in design, rugged in construction, and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

GENERAL DESCRIPTION OF THE PREFERRED EMBODIMENTS

Figure 1:
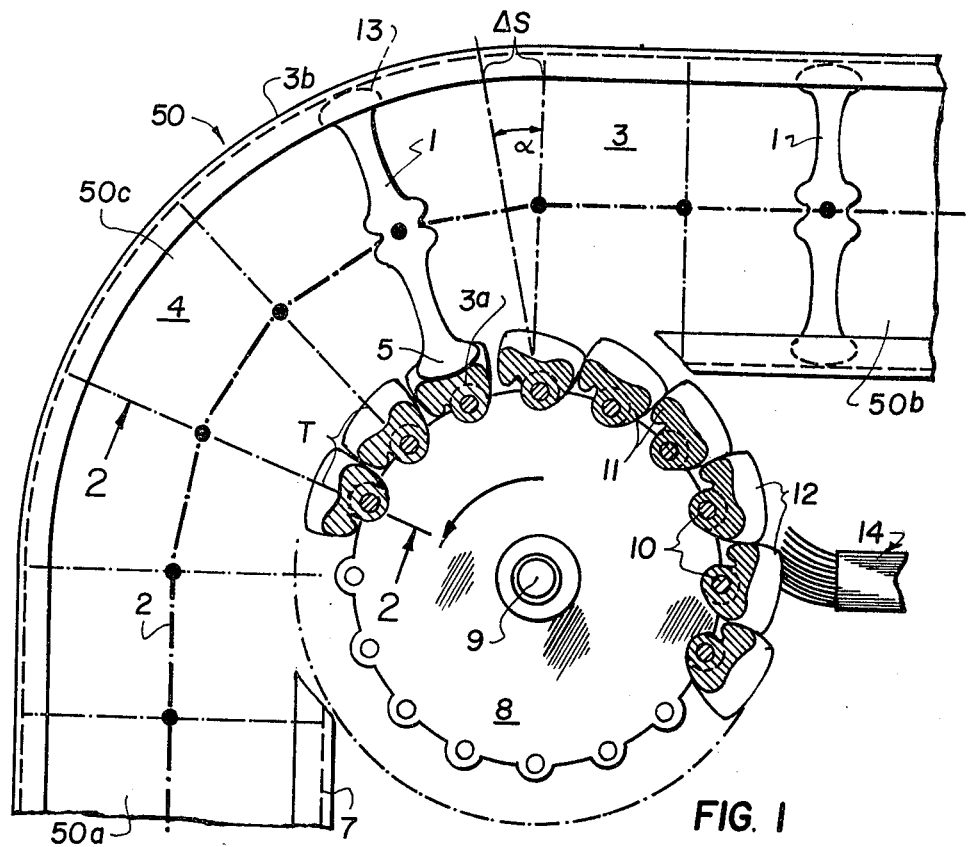
FIG. 1 is a partial top plan in partial horizontal sectional view of a single chain scraper conveyor constructed in accordance with the invention.
Figure 2:
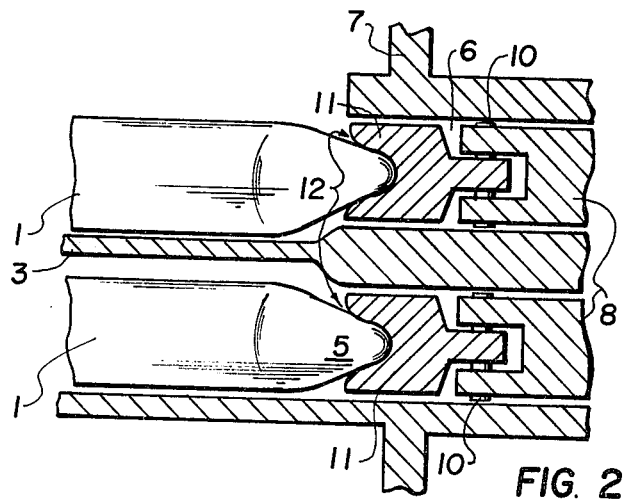
FIG. 2 is a section taken along the line 2-2 of FIG. 1.

Referring to the drawings in particular, the invention embodied therein comprises a conveyor generally designated 50 having first and second straight sections 50a and 50b disposed at right angles to each other, joined by an intermediate curved section 50c. The figures show a single chain scraper conveyor comprising flights 1 which are secured to an endless central chain 2 and guided in a conveyor trough 3 having a portion formed of circularly bent trough lengths 4. In the zone of the circularly bent trough segments 4, the flights 1, or the advancing (working) and return sides, engage tangentially and in radial position, of the chain by their inside ends 5. The inside ends are curved convexly and these ends follow a shorter actuate boundary 3a of the curved-path section having an outer arcuate boundary 3b. A pair of superposed deflector wheels 8 are positioned along the inner arcuate boundary 3a and they extend in the plane of motion of the flights and along the entire curved-path zone, and project into the conveyor trough 3 through respective apertures 6 provided in a side wall 7 of the trough.

Each deflector wheel 8 is provided with a plurality of pivoting heads 11 which are distributed over its circumference at distances corresponding to the spacing T of the adjacent flight ends 5. The heads 11 are mounted for pivoting about pins 10 which extend in parallel to the wheel axis 9. Pivoting heads 11 are provided, on their peripheral side, with recesses 12 for engaging with the inside ends 5 of the flights. The pivotal angle $\alpha$ of pivoting heads 11 is equal to or larger than the angle determined by the path-length difference $\Delta S$ between the free, outside 13 of the flights and the adjacent, inside ends 5 of the flights. Pivoting heads 11 are designed as partial segments of a trough section and their recesses 12 have the shape of V-shaped grooves or concave slide pockets. The pockets of recesses 12 are particularly suited for receiving the convex or cambered inside ends 5 of the flights. The pivoting heads 11 are shaped and mounted at pins 10 so that after a flight 1 engages with a head 11, the head 11 pivots to reduce the effective outer radius thereof and compensate for the pivot angle.

Pivoting heads 11 may be exchangeably secured to the circumference of the deflector wheel 8 and they are made of a wear-resistant material such as chilled cast iron, cast steel, or the like. Between the zone of disengagement and engagement of flights 1 with deflector wheel 8, pivoting heads 11 are associated with a reset mechanism 14, for example, a cleaning brush or a leaf spring.

While specific embodiments of the invention have been shown and described in detail to illustrate the application of the principles of the invention, it will be understood that the invention may be embodied otherwise without departing from such principles.

What is claimed is:

1. A scraper conveyor, comprising a trough having first and second straight sections disposed at angles to each other, and an intermediate curved section between and joining said first and second straight sections, said intermediate section having an inner curved edge and an outer curved edge, said trough having an opening along said inner curved edge, an endless chain centered in and movable along said trough, a plurality of flights secured to said chain at spaced locations along the length thereof and extending transversely of said chain and having an outer end which moves around adjacent the outer edge of said intermediate section and an opposite inner end which moves around said inner curved edge, a deflector wheel rotatably mounted about an axis adjacent said intermediate section so that a portion of its periphery moves parallel to said inner curved edge of said intermediate curved section, a plurality of heads pivotally mounted on said deflector wheel adjacent the periphery thereof at spaced circumferential locations around its periphery and having outer ends extending through the opening of said intermediate section, said inner ends of said flights being engageable on respective head outer ends and being guided around the inner curved edge of said intermediate curved section, and a reset mechanism disposed adjacent the periphery of said deflector wheel in a path to engage over the outer ends of said heads.

2. A scraper conveyor according to claim 1 wherein said reset mechanism comprises a cleaning brush.

* * * * *